Patented Aug. 27, 1935

2,012,506

UNITED STATES PATENT OFFICE 2,012,506

EDIBLE DUSTING POWDER

Carroll L. Griffith, Chicago, Ill., assignor to The Griffith Laboratories, Inc., Chicago, Ill., a corporation of Illinois No Drawing. Application May 16, 1932, Serial No. 611,638

6 Claims. (Cl. 99—11)

The present invention relates to powder coatings for fried cakes such as doughnuts. The invention is not limited to doughnuts and is applicable to any food having a greasy skin layer, such as pie crusts and deep fried foods.

In order to meet the purposes of the coating for doughnuts, it is desirable to cover the entire surface with the powder, thus to hide the cake itself, and to present a fresh white appearance by means of the powder. Using sugar alone, difficulties are encountered. The powdered sugar draws grease from the doughnut and the sugar indicates its resulting grease-laden condition. When a doughnut is fully covered, as is desired, with sugar alone, so much sweetening is present that the sugar overcomes the flavor of the doughnut, and the article so covered is not so palatable. Accordingly, sugar alone is unsatisfactory as a covering powder.

When the food to be covered is a doughnut, the powdered sugar ordinarily used is applied while the doughnut is warm and in process of cooling. The doughnut contains much moisture and grease. The moisture in particular is readily taken up by the sugar, partially dissolving the latter with the formation of a sticky coating. The dissolved sugar causes many of the discrete sugar grains to coalesce into a lump or mass. This further destroys the appearance of the sugar and makes the doughnut unpleasant to handle. Such sticky doughnuts cannot be packed together without further destruction of a fresh attractive appearance.

The present invention aims to overcome the defects of sugar alone by providing a sweet composition in powder form, which can be used in sufficient quantity to cover the doughnut, which will adhere to the doughnut, which will not be too sweet, which will not get sticky, and which will remain fresh in appearance.

A particular object is the provision of a starchy material as a base for the powder, with a sweetening agent associated therewith.

Another object of the invention is the provision of sugar as the sweetening agent in the starchy base.

Still another object of the invention is the provision of a sweet gelatinizing powder which contains grease.

Various other and ancillary objects and advantages of the invention will become apparent from the following description and explanation of the invention.

In completely covering an article such as a doughnut with a white powder, sugar alone is too sweetening, and according to this invention a powder is used having less sweetness than pure sugar. The sweetness may be provided by any sweetening material such as sucrose, dextrose, glucose and the like, or other sweet carbohydrate, or by a different type of sweetening agent such as saccharine. Since saccharine and any of the common sugars of trade are sweeter in themselves than is the desired powder of this invention, a diluent is used. Because a white color is ordinarily desired, a white diluent is used. A starchy substance is the preferred diluent, and I may use one or more various processed flours or starches, and hereinafter I refer to such material as gelatinized or disrupted starchy material, since such processed grains which have been disrupted provide a more highly absorptive form of starch.

The gelatinized starchy material may be considered generally as an absorptive base to be sweetened appropriately with the sweetening agent. If saccharine is used, only a small quantity is required in proportion to the base. Where sucrose, such as ordinary cane sugar, is employed, a larger amount is required such that the mixture may, if desired, predominate in sugar. I may have less sugar than starch, or may have about equal parts of gelatinized starchy material and of cane sugar to form a powder of lower degrees of sweetness than sugar, and may have up to three times as much cane sugar as gelatinized starchy material for a powder of higher sweetness, but also of sweetness less than sugar. Where saccharine is used, for example a form which is five hundred times as sweet as sugar, I may use 1/500th as much saccharine as sugar.

The sweetened gelatinized starchy material is of itself not a satisfactory composition. The highly absorptive starchy material blots up and absorbs the surface grease on the doughnut and keeps the sugar too dry so that the sugar falls off.

When the powder is a mixture of starch and sugar alone it is not easily handled in manufacture, in shipping, or in application. It is light and dusty. The sugar and starchy agent do not remain in intimate mixture and in shipping, tend to separate. In application, much material is lost by the dust formed.

To overcome each and all of these difficulties encountered in such materials other substance is employed, which may act in several capacities. An agent is employed for rendering the gelatinized starchy material and sugar more coherent to each other. An agent is employed for weighting the powder particles to prevent dust. An agent is employed for securing adherence to the doughnut. An agent is employed which isolates each grain by providing a coating for it. An agent is employed which makes the powder, water and moisture repellent and grease absorptive.

I have found that a single fatty agent may accomplish all these functions simultaneously. I prefer to use a stable grease, such as an edible hydrogenated fat as an ingredient in the powder of this invention. For example, sugar, a gelatinized starchy agent, and a suitable fat or grease are thoroughly mixed to homogeneity and stability, by mixing a fat and the powder substances in a grinder. The fat may be melted, or may be worked into the mixture without melting. The grinding assures the provision of a small particle of the powder, each with a fat coating thereon, and even fat impregnated in a particle to some extent. Thus, each particle presents a grease or fat surface, and unlike powder grains without such surface, they are coherent and non-dusty, yet separable and individual, but resistant to settling in admixture. The grease also weights the particles, renders them water and moisture resistant, yet easily capable of taking on more grease without alteration of appearance. They may take on grease selectively with reference to moisture. In other words the mixture of this invention absorbs grease and repels water or moisture. The mixture blots up the surface grease on the doughnut but does not absorb or draw moisture from the doughnut which would be undesirable and tend to promote more rapid staling.

Upon application to the doughnut the powder already carrying grease adheres. With the grease in the doughnut and the grease in the powder, the two are coherent or adherent. Being ground to whiteness and already containing grease, any additional grease which the powder may absorb does not alter its whiteness. The particles maintain their individuality and do not agglomerate. Being grease covered, the particles are water-proofed or moisture-proofed, and do not attract moisture from the air, or the doughnut, and thereby as a result agglomerate into sticky lumps. Hence the powder at the surface remains as a dry, but greasy powder, which will not cake or lump before or after use, and which is unalterable in appearance after application.

In selecting a suitable grease or fat it is preferred to use one of a limited melting point when its intended use is for doughnuts in the usual manner. Sugar is applied to doughnuts before the doughnuts are cold and in process of cooling. A grease is preferred which will melt at the application temperature of the cooling doughnut, in other words a low melting point fat, so that when softened or melted by the doughnut and thereafter cooled to a lower degree, the fat in the powder cools in contact with the doughnut, and freezes to it. Ordinarily, a grease is chosen similar to the grease in which the doughnut is fried, so that it may be said that the grease in the doughnut and the grease on the inner powder grains become as one body on cooling. Thus, the grease anchors the powder to the doughnut. The adherent powder remains white and dry.

In practical use the following ingredients are preferred, and hence the following compositions are given as examples to illustrate specifically the nature of the invention.

*Example*

| | Parts |
|---|---|
| Granulated cane sugar | 50 |
| Processed flour | 25 |
| Stable hydrogenated oil (melting point range 85° F. to 95° F.) | 5 |
| Flavor (such as oils to suit) | Trace |

The flour referred to is a high absorbent corn flour, made by steaming and flaking grits and subsequently drying and powdering. The starch grains are thereby broken and the cells are disrupted. To make the processed or high absorbent corn flour the outer coat and germ of corn are removed producing hard granules called corn grits. These are steamed and flaked between heated rolls at high pressure causing the starch cells to pop or burst greatly increasing the absorption similar to bursting starch cells in starch paste where a small amount of starch will make a large quantity of stiff paste.

In making the powder, the flour and the sugar are mixed, and the melted fat is sprayed onto the mixture. Thorough mixing follows, and the product is reduced to a fine powder, as by grinding in a hammer mill. The proportions in the above may be readily varied to have

| | Per cent |
|---|---|
| Flour | 25 |
| Fat | 4 |
| Sugar | 71 |

The proportion of grease or fat is variable, as a general rule, as the percentage of starchy material increases. This is in accordance with the increased capacity of the mixture for holding grease, the starch being much more absorptive of grease than the sugar. Accordingly, there is no set proportion for grease to either sugar or starch nor to the combination. The quantity of grease will determine the extent to which the advantages will obtain for any fixed ratio of starchy material to sugar.

The processed flour above described is an example of a grease-absorptive colloidal substance which gelatinizes rapidly with water. The processed flour is distinguishable in properties from undisrupted starch grains in numerous respects. Pertinent to the present invention the processed flour has a high capacity for moisture or water. For example if equal parts of corn starch and of dried gelatinized corn flour are separately treated with four times the weight of water, stirred, and allowed to stand, it will be found that the ordinary corn starch settles away from supernatant water, the layer of water being greater than the layer of starch. The processed flour forms a stiff mass or "mush" rapidly on contact with the water. Such gelatinized flour in the composition of this invention quickly absorbs and holds the available moisture on the doughnut skin and prevents it going into any sugar present in the composition as a sweetening agent, or into any of the sweetened starch which remains unmoistened at the exterior of the applied coating. Thus the applied powder remains dry and white and is practically unaffected in appearance by the moisture from within the doughnut. The presence of grease in the composition does not prevent the gelatinized starch from taking up the water in the manner described, but the grease on the sugar particles aids in retarding the effect of moisture on the sugar. When dusted doughnuts are exposed for sale in retail channels, the gelatinized flour takes up moisture from the air, which in the absence of such flour would be taken up by the sugar making the sugar sticky. Hence on long standing the powder remains dry and white and the article remains fresh and attractive in appearance.

The invention is not limited to the procedure above described. The starch itself may be impregnated with the grease, and the sugar thereafter mixed with it. By transfer of grease from starch to sugar, the mixture will approach an equilibrium distribution of grease. This may take place on standing, or in shipment. However, the given example is preferred.

While I have made certain statements herein which may be theoretical explanation of the ultimate facts, I do not bind myself to any particular theory. I do know, however, that the compositions herein described are far more stable, particularly on doughnuts.

The invention is subject to modification in obvious ways, as for example incorporating special colors and flavors. Solid colored particles may be present. Pure food dyestuffs may be used, either in the mixture, in the absorbent powder, in the sugar, or in the grease. The flavors may be added in the same way. However, it is preferred that fat soluble dyes be not used, as these may migrate into the food.

The invention generally may be considered as an absorptive base, impregnated to some extent with edible fat, and suitably sweetened, and also a food covered with such material, as set forth broadly in the accompanying claims.

I claim:

1. A dusting powder for greasy foods such as doughnuts consisting of a grease-absorbent powder of at least about 25% of disrupted starch grains, a grease impregnating said powder, and a sweetening agent.

2. The method of making a dusting powder for greasy foods which consists of mixing a dry mass of at least 25% of disrupted starch grains and in addition a sweetening agent, spraying melted grease onto said mixed material, and mixing and grinding the resulting mass to a fine powder.

3. The method of making a dusting powder for greasy foods which consists of grinding to a fine powder a mixture of a dry mass of at least 25% of disrupted starch grains, a grease and a sweetening agent.

4. The method of making a dusting powder for greasy foods which consists of subjecting about 25 parts of a dry powdery mass of disrupted starch grains to contact with about 4 to 5 parts of grease whereby to attach grease to the powder particles, then adding not more than about 70 parts of a sweet edible powder to the greasy powder, and thereafter permitting the mass to assume an equilibrium distribution of the grease.

5. The method of making a dusting powder for greasy foods which consists of subjecting about 25 parts of disrupted starch grains in powder form to contact with 4 to 5 parts of grease whereby to attach grease to the powder particles, then adding not more than about 70 parts of powdered sugar to the greasy starch powder, and thereafter permitting the mass to assume an equilibrium distribution of the grease.

6. The method of making a dusting powder for greasy foods which consists of grinding not over about 70 parts sugar in the presence of grease-impregnated dry mass of disrupted starch grains containing about 25 parts of such starch and about 4 to 5 parts of grease.

CARROLL L. GRIFFITH.